United States Patent [19]

Aoki

[11] Patent Number: 5,172,758

[45] Date of Patent: Dec. 22, 1992

[54] CONDENSER WITH A BUILT-IN RECEIVER

[75] Inventor: Hisao Aoki, Maebashi, Japan

[73] Assignee: Sanden Corporation, Gunma, Japan

[21] Appl. No.: 722,403

[22] Filed: Jun. 20, 1991

Related U.S. Application Data

[63] Continuation of Ser. No. 470,254, Jan. 25, 1990, abandoned.

[30] Foreign Application Priority Data

Feb. 1, 1989 [JP] Japan .................. 1-9858[U]

[51] Int. Cl.⁵ .............................. F28B 9/08
[52] U.S. Cl. ................... 165/110; 165/153; 165/174
[58] Field of Search .......... 165/104.22, 110, 132, 165/153, 174

[56] References Cited

U.S. PATENT DOCUMENTS

| | | | |
|---|---|---|---|
| 1,795,878 | 3/1931 | Mougey | 165/110 |
| 2,068,549 | 1/1937 | Knight | 165/104.22 |
| 2,200,788 | 5/1940 | Coy | 165/110 |
| 2,612,349 | 9/1952 | Lintern | 165/110 |
| 3,063,682 | 11/1962 | Greene et al. | 165/110 |
| 4,336,837 | 6/1982 | Koenig | 165/104.22 |
| 4,467,862 | 8/1984 | Debeni | 165/104.22 |
| 4,515,209 | 5/1985 | Maidanik et al. | 165/104.22 |
| 4,679,410 | 7/1987 | Drayer | 165/153 |
| 4,825,941 | 5/1989 | Hoshino et al. | 165/110 |

FOREIGN PATENT DOCUMENTS

| | | | |
|---|---|---|---|
| 188319 | 1/1957 | Austria | 165/110 |
| 63-112065 | 5/1988 | Japan | |
| 160689 | 10/1957 | Sweden | |
| 143822 | 5/1920 | United Kingdom | |

Primary Examiner—Allen J. Flanigan
Attorney, Agent, or Firm—Baker & Botts

[57] ABSTRACT

A condenser for a refrigerant circuit including a compressor, a condenser, an expansion valve and an evaporator which are sequentially disposed is disclosed. The condenser includes a plurality of tubes having opposite first and second open ends, and a plurality of fins disposed between the plurality of tubes. First and second header pipes are fixedly disposed at the opposite ends respectively, and the open ends of the tubes are disposed in fluid communication with the interior of the header pipes. The first header pipe has an inlet which links the condenser to an external element of the circuit. The second header pipe has a first open end and a second closed end. An outlet element is disposed at the first open end of the second header pipe and links the condenser to an external element of the circuit. A pipe member is disposed in the second header. One open end of the pipe member is disposed near the closed end of the second header, and the other open end of the pipe member is disposed near the outlet. In operation, the refrigerant fluid which condenses in the condenser accumulates in an accumulating section and than flows out to the external fluid circuit from the second header exclusively through the pipe member. Since the condenser includes an accumulator section disposed therein, the need for a separate receiver element in the circuit is eliminated.

30 Claims, 6 Drawing Sheets

CONDENSER WITH A BUILT-IN RECEIVER

This application is a continuation of application Ser. No. 07/470,254, filed Jan. 25, 1990 now abandoned.

BACKGROUND OF THE INVENTION

1. Technical Field

The present invention relates to a heat exchanger, and more particularly, to a heat exchanging condenser for use in an automotive air-conditioning system.

2. Description of the Prior Art

With reference to FIG. 1, a conventional refrigeration circuit for use, for example, in an automotive air-conditioning system is shown. Circuit 1 includes compressor 10, condenser 20, receiver or accumulator 30, expansion device 40, and evaporator 50 serially connected through pipe members 60 which link the outlet of one component with the inlet of a successive component. The outlet of evaporator 50 is linked to the inlet of compressor 10 through pipe member 60 so as to complete the circuit. The links of pipe members 60 to each component of circuit 1 are made such that the circuit is hermetically sealed.

In operation of circuit 1, refrigerant gas is drawn from the outlet of evaporator 50 and flows through the inlet of compressor 10, and is compressed and discharged to condenser 20. The compressed refrigerant gas in condenser 20 radiates heat to an external fluid flowing through condenser 20, for example, atmospheric air, and condenses to the liquid state. The liquid refrigerant flows to receiver 30 and is accumulated therein. The refrigerant in receiver 30 flows to expansion device 40, for example, a thermostatic expansion valve, where the pressure of the liquid refrigerant is reduced. The reduced pressure liquid refrigerant flows through evaporator 50, and is vaporized by absorbing heat from a fluid flowing through the evaporator, for example, atmospheric air. The gaseous refrigerant then flows from evaporator 50 back to the inlet of compressor 10 for further compression and recirculation through circuit 1.

With further reference to FIGS. 1a, and 2-5, a prior art embodiment of condenser 20 as disclosed in Japanese Patent Application Publication No. 63-112065 is shown. Condenser 20 includes a plurality of adjacent, essentially flat tubes 21 having an oval cross-section and open ends which allow refrigerant fluid to flow therethrough. A plurality of corrugated fin units 22 are disposed between adjacent tubes 21. Circular header pipes 23 and 24 are disposed perpendicularly to flat tubes 21 and may have, for example, a clad construction. Each header pipe 23 and 24 includes outer tube 26 which may be made from aluminum and inner tube 28 made of a metal material which is brazed to the inner surface of outer tube 26. Outer tube 26 has slots 27 disposed therethrough. Flat tubes 21 are fixedly connected to header pipes 23 and 24 and are disposed in slots 27 such that the open ends of flat tubes 21 communicate with the hollow interior of header pipes 23 and 24. Inner tube 28 includes portions 28a which define openings corresponding to slots 27. Portions 28a are brazed to the inner ends of flat tubes 21 and ensure that tubes 21 are hermetically sealed within header pipes 23 and 24 when inserted in slots 27.

Header pipe 23 has an open top end and a closed bottom end. The open top end is sealed by inlet union joint 23a which is fixedly and hermetically connected thereto. Inlet union joint 23a is linked to the outlet of compressor 10. Partition wall 23b is fixedly disposed within first header pipe 23 at a location about midway along its length and divides header pipe 23 into upper cavity 231 and lower cavity 232 which is isolated from upper cavity 231. Second header pipe 24 has a closed top end and an open bottom end. The open bottom end is sealed by outlet union joint 24a fixedly and hermetically connected thereto. Outlet union joint 24a is linked to the inlet of receiver 30. Partition wall 24b is fixedly disposed within second header pipe 24 at a location approximately one-third of the way along the length of second header pipe 24 and divides second header pipe 24 into upper cavity 241 and lower cavity 242 which is isolated from upper cavity 241. The location of partition wall 24b is lower than the location of partition wall 23a.

In operation, compressed refrigerant gas from compressor 10 flows into upper cavity 231 of first header pipe 23 through inlet union joint 23a, and is distributed such that a portion of the gas flows through each of flat tubes 21 which is disposed above the location of partition wall 23b, and into an upper portion of upper cavity 241. Thereafter, the refrigerant in the upper portion of cavity 241 flows downward into a lower portion of upper cavity 241, and is distributed such that a portion flows through each of the plurality of flat tubes 21 disposed below the location of partition wall 23b and above the location of partition wall 24b, and into an upper portion of lower cavity 232 of first header pipe 23. The refrigerant in an upper portion of lower cavity 232 flows downwardly into a lower portion, and is again distributed such that a portion flows through each of the plurality of flat tubes 21 disposed below the location of partition wall 24b, and into lower cavity 242 of second header pipe 24. As the refrigerant gas sequentially flows through flat tubes 21, heat from the refrigerant gas is exchanged with the atmospheric air flowing through corrugated fin units 22 in the direction of arrow W as shown in FIG. 5. Since the refrigerant gas radiates heat to the outside air, it condenses to the liquid state as it travels through tubes 21. The condensed liquid refrigerant in cavity 242 flows out therefrom through outlet union joint 24a and into receiver 30 and the further elements of the circuit as discussed above.

In the prior art refrigeration circuit 1 as shown in FIGS. 1-5, condenser 20 and receiver 30 are distinct elements which are separately disposed within the engine compartment of the automobile. Therefore, condenser 20 and receiver 30 occupy a large portion of the limited free space within the engine compartment of the automobile which is available for the refrigeration circuit. Furthermore, the provision of a separate receiver and condenser complicates the installation of the refrigerant circuit into the engine compartment.

SUMMARY OF THE INVENTION

The present invention is directed to a condenser for a refrigerant fluid circuit. The condenser includes a plurality of tubes having opposite first and second open ends, and a plurality of fin units disposed between the plurality of tubes. First and second header pipes are fixedly disposed at the opposite ends respectively, and the open ends of the tubes are disposed in fluid communication with the interior of the header pipes. The first header pipe has an inlet which links the condenser to an external element of the circuit. The second header pipe has a first open end and a second closed end. An outlet is disposed at the first open end of the second header pipe and links the condenser to an external element of the circuit. A pipe member is disposed in the second header. One open end of the pipe member is disposed near the closed end of the second header, and the other open end of the pipe member is hermetically linked to the outlet. In operation, the refrigerant fluid flows out to the external fluid circuit from the second header exclusively through the pipe member.

In a further embodiment, the condenser includes therein an accumulator which collects the fluid condensed in the condenser before it flows out through the pipe member.

In a further embodiment, the second header pipe has first and second open ends. The first open end is hermetically sealed by the outlet except for a channel formed therethrough. The second open end is closed by an accumulating element such that the second end opens therein. The pipe member includes a first open end which extends beyond the second open end of the second header and opens into the accumulating element and a second open end which is hermetically linked in fluid communication with the channel formed in the outlet.

In a further embodiment the accumulating element is a rectangular parallelepiped tank which projects beyond the lower surface of the condenser.

In a further embodiment the accumulating element is a rectangular parallelepiped tank which extends into the heat exchange region defined by the tubes and the fin units such that the lengths of some of the tubes are shorter than the remaining tubes.

In a further embodiment the second header has a closed end and an opening formed through the peripheral surface at a location above the closed end. A cylindrical tank including an open end and a closed end is fixedly disposed between the first and second headers. The open end of the cylindrical tank is disposed within the opening of the second header and the interior of the second header and the cylindrical tank are in fluid communication such that condensed refrigerant accumulates in the tank.

In a further embodiment the invention comprises a refrigerant fluid circuit including a compressor, a condenser as described in any of the above embodiments, an expansion device and an evaporator.

The present invention provides the advantage of reducing the volume of limited space within the engine compartment which must be devoted to the refrigerant circuit since the condenser and receiver are combined into one element which occupies less space than the separate elements utilized in the prior art. Moreover, the provision of a single combined condenser and receiver eliminates an entire distinct element from the refrigerant circuit, simplifying the installation of the refrigerant circuit within the engine compartment of the automobile.

Further advantages, features, and other aspects of this invention will be understood from the detailed description of the preferred embodiments of this invention with reference to the drawings.

BRIEF DESCRIPTION OF THE DRAWINGS

FIG. 2 is a perspective view of certain elements of the condenser shown in FIG. 1a.

FIG. 3 is a top view of the condenser shown in the prior art of FIG. 1a.

FIG. 4 is a partial cross-section along line 4—4 in FIG. 1a.

FIG. 5 is a partial cross-section along line 5—5 in FIG. 1a.

DETAILED DESCRIPTION OF THE PREFERRED EMBODIMENTS

Figure 4:
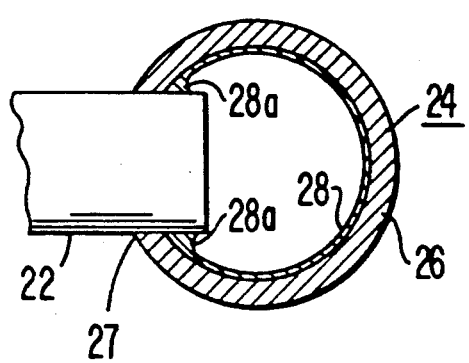
Figure 5:
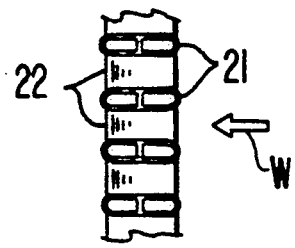

With reference to FIGS. 6-9, the construction of a condenser in accordance with a first embodiment of the present invention is shown. In the figures, the same reference numerals are used to denote corresponding elements shown in the prior art figures. Therefore, a complete explanation of those elements is omitted. Condenser 200 includes first header pipe 230 having an open top end and a closed bottom end, and second header pipe 301 with both an open top end and an open bottom end. A plurality of adjacent and parallel flat tubes 21 having open ends are disposed perpendicularly to first header pipe 230 and second header pipe 301. The ends of tubes 21 are fixedly disposed in header pipes 230 and 301 as shown in FIG. 4 such that the openings of tubes 21 are in fluid communication with the hollow interiors of the header pipes. Corrugated fin units 22 are disposed between adjacent flat tubes 21. Tubes 21 and fin units 22 jointly form heat exchanging region 200a. Inlet union joint 230a is fixedly and hermetically connected to the open top end of first header pipe 230. Outlet union joint 240a is fixedly and hermetically connected to the open top end of second header pipe 301. The various components of condenser 200 are joined together by brazing.

Figure 8:
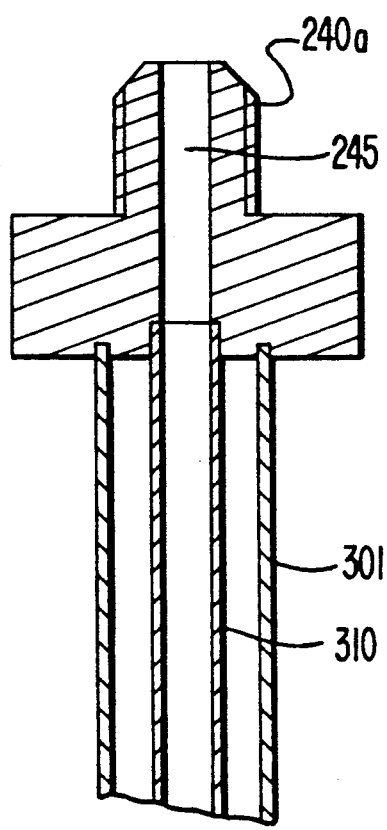
FIG. 8 is an enlarged fragmentary sectional view along line 8—8 shown in FIG. 6.
Figure 9:
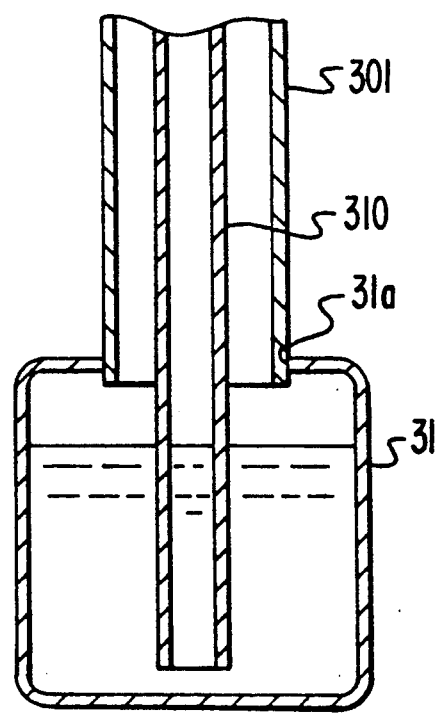
FIG. 9 is an enlarged fragmentary sectional view along line 9—9 shown in FIG. 6.

With further reference to FIGS. 8 and 9, vertical pipe member 310 is disposed in the hollow interior of second header pipe 301, in a concentric arrangement. Outlet union joint 240a hermetically seals the open top end of header pipe 301 and includes channel 245 disposed therethrough which is linked by pipe members 60 to a further element of the refrigerant circuit. Rectangular parallelpiped tank 31 includes opening 31a therethrough and is fixedly and hermetically connected to the bottom open end of header pipe 301. The top open end of pipe member 310 is fixedly and hermetically connected to a lower surface of outlet union joint 240a and is in fluid communication with channel 245. The interior region of header 301 which is exterior of pipe member 310 is isolated from channel 245 except for the link through pipe member 310. The lower open end of pipe member 310 extends beyond the lower open end of header pipe 301, through hole 31a, and terminates above and adjacent to the bottom surface of tank 31. As shown in FIG. 9, tank 31 has a larger cross-sectional area than header pipe 302.

In operation of condenser 200 of the present invention, compressed refrigerant gas from compressor 10 flows through inlet union joint 230a and into first header pipe 230, and is distributed such that a portion of the refrigerant gas flows through each of the plurality of flat tubes 21. The refrigerant gas within flat tubes 21 exchanges heat with the atmosphere and condenses to the liquid state. The condensed liquid refrigerant flows through the openings of flat tubes 21 and into second header pipe 301. The condensed liquid refrigerant in header pipe 301 is isolated from external refrigerant circuit 1 due to the hermetic sealing between pipe member 310 and channel 245 of outlet union joint 240a, and the refrigerant liquid drips downwardly into tank 31 and is accumulated therein.

Figure 1:
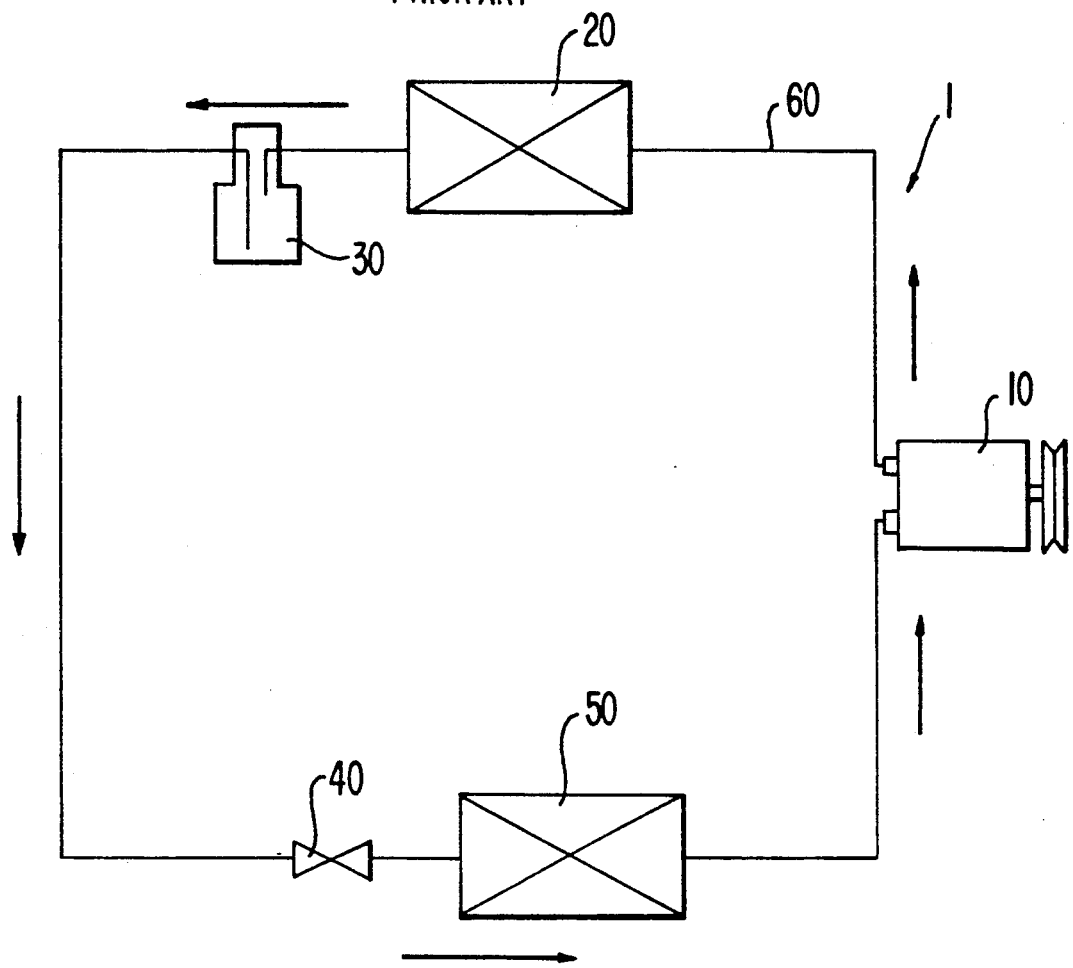
FIG. 1 is a schematic block diagram of a refrigerant circuit in accordance with the prior art.
Figure 2:
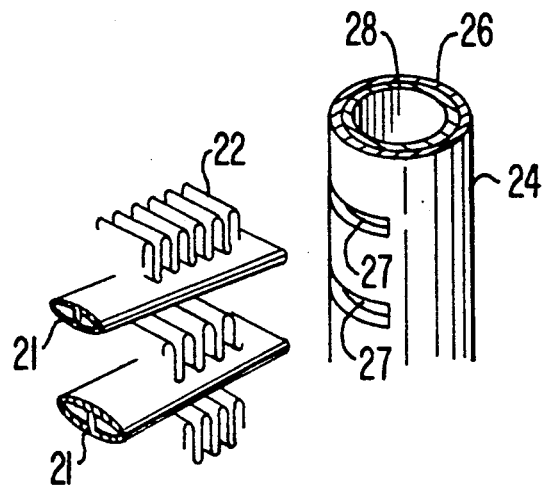
Figure 1A:
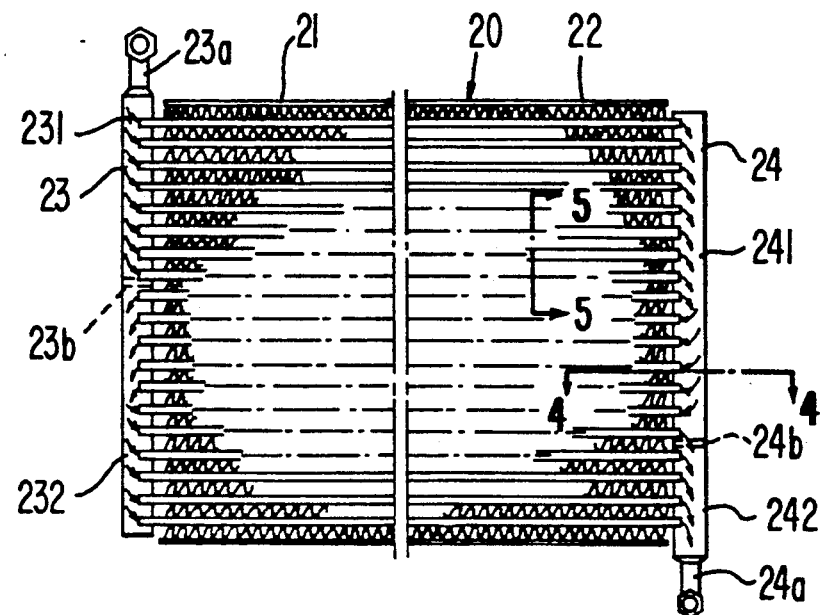
FIG. 1a is an elevational view of the condenser shown in the refrigerant circuit of FIG. 1.
Figure 3:
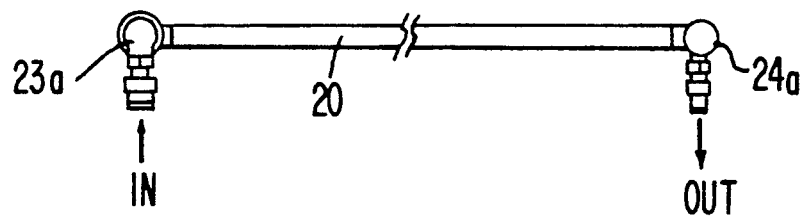

Condenser 200 of the present invention would be disposed within the circuit shown in FIG. 1 such that outlet union joint 240a would be linked directly to the inlet of the next element of the circuit, that is, expansion device 40. Due to the operation of compressor 10, the condensed liquid refrigerant in tank 31 flows upwardly through pipe member 310, and sequentially through channel 245 of outlet union joint 240a and into expansion device 40 through pipe member 60. Additionally, the volume of the refrigerant which flows from tank 31 to evaporator 50 may be controlled by varying the throttling effect of expansion device 40 in a known manner.

Since tank 31 serves the purpose of receiver 30, the necessity for providing the refrigerant circuit with a separate condenser and a separate receiver is eliminated, and the overall size of the refrigerant circuit is reduced such that it takes up less free space within the engine compartment of the automobile. Additionally, the construction of the refrigerant circuit according to the present invention is simplified.

Figure 10:
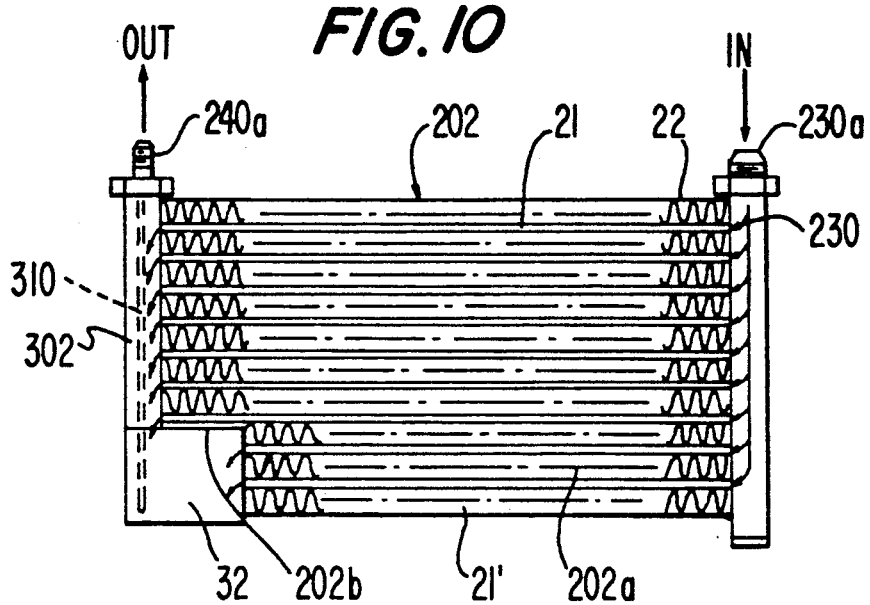
FIG. 10 is an elevational view of a condenser in accordance with a second embodiment of the present invention.
Figure 11:
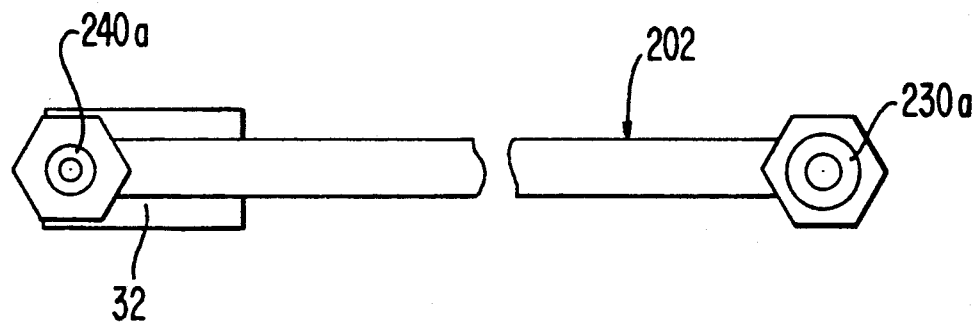
FIG. 11 is an enlarged top view of the condenser shown in FIG. 10.

With reference to FIGS. 10 and 11, a condenser according to a second embodiment of the present invention is shown. Condenser 202 includes first header pipe 230 disposed on one side of flat tubes 21 as in FIG. 6. Condenser 202 further includes second header pipe 302 disposed on the opposite side of tubes 21. As in the embodiment of FIG. 6, the open ends of tubes 21 are disposed within header pipes 230 and 302 such that refrigerant gas flows through flat tubes 21 from header pipe 230 towards header pipe header 302, and condenses therein such that the condensed liquid refrigerant flows into header pipe 302. Second header pipe 302 has open top and bottom ends and is shorter than first header pipe 230, extending only partially along the left side of condenser 202. Rectangular parallelepiped tank 32 is disposed in space 202b which is located at the lower left corner of heat exchanging region 202a defined by flat tubes 21 and fins 22. As shown in FIG. 10, tank 32 has a larger cross-sectional area than header pipe 301. A lower group of flat tubes comprises one or more flat tubes 21' which are shorter than flat tubes 21. Flat tubes 21' are inserted into openings in tank 32 such that refrigerant fluid may flow directly from flat tubes 21' into tank 32. Accordingly, a portion of heat exchange region 202a is occupied by tank 32.

Pipe member 310 is disposed within header pipe 302 such that the top open end is hermetically fixed to outlet union joint 240a at channel 245 as shown in FIG. 8, and the bottom open end extends beyond the lower end of header pipe 302 and terminates adjacent the bottom surface of tank 32. The operation of condenser 202 is similar to the operation of condenser 200 except that the refrigerant which condenses in tubes 21' flows directly into tank 32. As in the embodiment of FIGS. 6–9, the refrigerant fluid which collects in tank 32 flows upwardly through pipe member 310 and through channel 245 to an external element of the circuit through pipe member 60.

Figure 6:
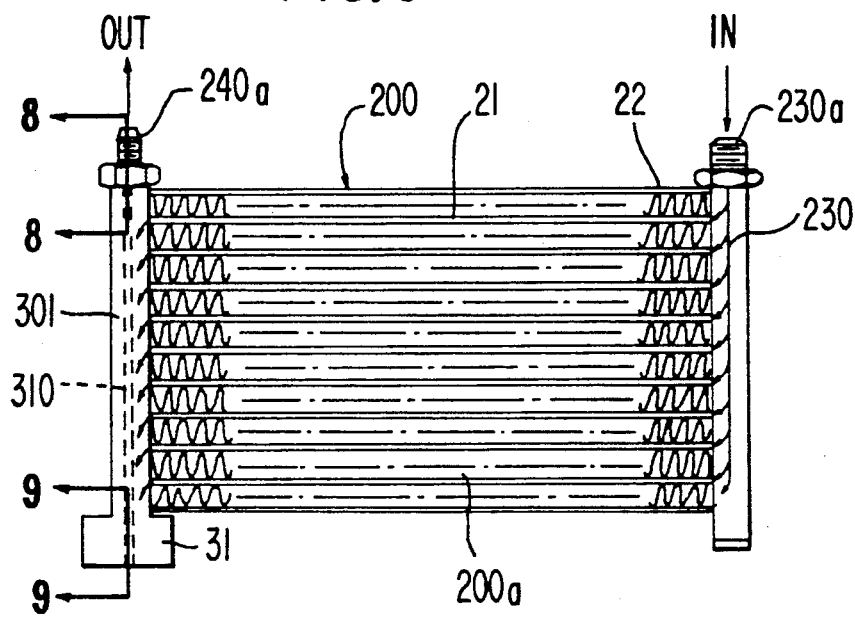
FIG. 6 is an elevational view of a condenser in accordance with a first embodiment of the present invention.
Figure 7:
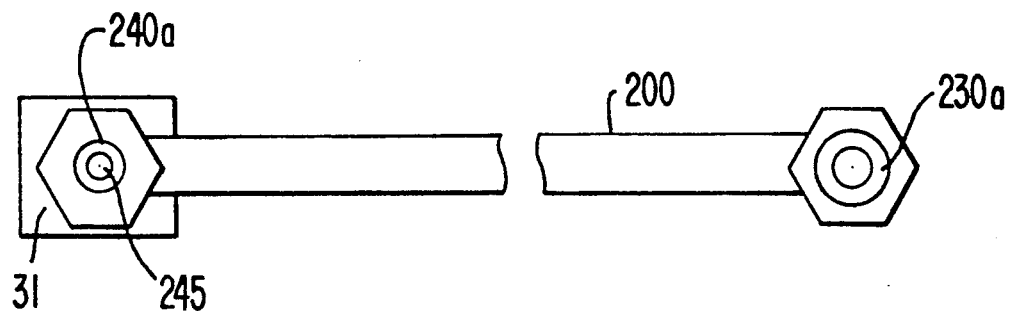
FIG. 7 is an enlarged top view of the condenser shown in FIG. 6.

In the embodiment of FIGS. 10 and 11, the cross-sectional area of heat exchanging region 202a is reduced as compared with heat exchanging region 200a of the embodiment shown in FIG. 6. Therefore, condenser 202 has a slightly lower heat exchanging capability than condenser 200. However, the volume of atmospheric air which passes through condenser 200 at a location near the corners of heat exchanging region 200a, that is, the regions where the flat tubes are inserted in the header pipes, is generally much less than the volume passing through the central part of the heat exchanging region. Thus, the heat exchanging capability of the corners is greatly reduced as compared to the center. Therefore, the reduction of the heat exchanging capability of condenser 202 as compared with condenser 200 of FIG. 6 or with a prior art condenser is only minimal. Furthermore, the embodiment of FIGS. 10 and 11 provides the added advantage that tank 32 does not protrude outwardly from heat exchanging region 202a. Thus, the volume of space in the engine compartment which is needed for condenser 202 is reduced.

Figure 12:
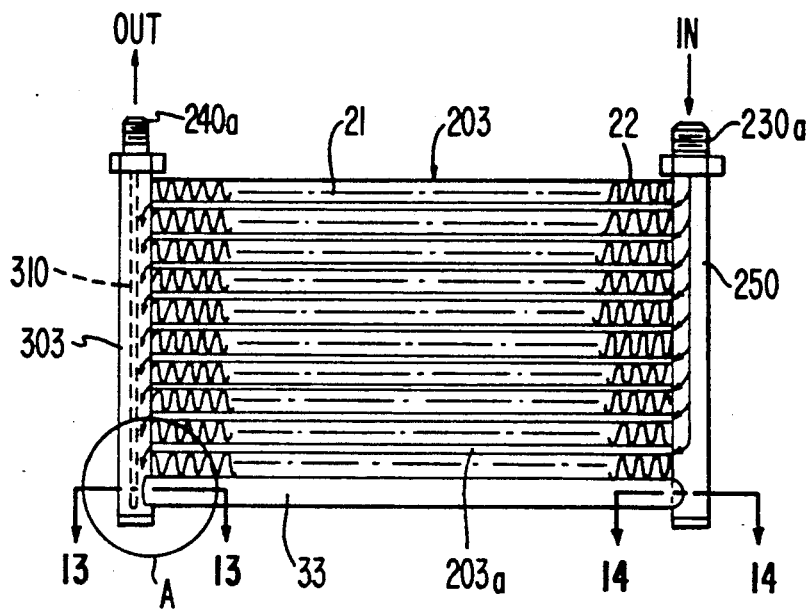
FIG. 12 is an elevational view of a condenser in accordance with a third embodiment of the present invention.
Figure 12A:
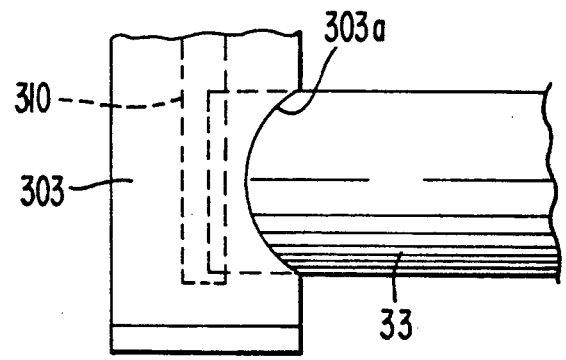
FIG. 12a is a close-up view of the region shown in circle A in FIG. 12.
Figure 13:
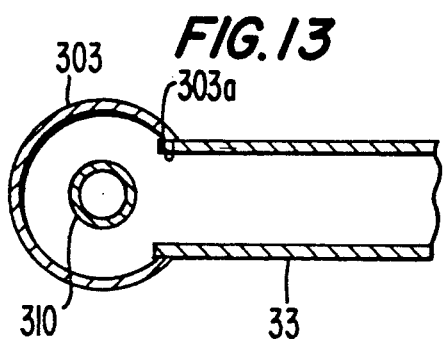
FIG. 13 is an enlarged fragmentary sectional view along line 13—13 of FIG. 12.
Figure 14:
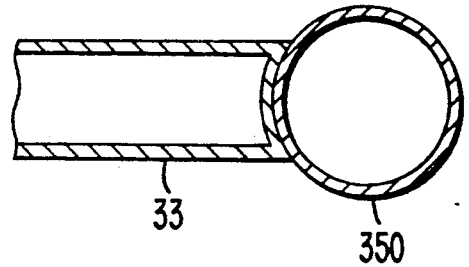
FIG. 14 is an enlarged fragmentary sectional view along line 14—14 of FIG. 12.

With respect to FIGS. 12-14, a third embodiment of the present invention is shown. Condenser 203 includes first header pipe 250 disposed at one side of a plurality of flat tubes 21, and second header pipe 303 disposed at the opposite side. The lower ends of header pipes 250 and 303 extend beyond the lower boundary of heat exchanging region 203a. Second header pipe 303 has an open top end and a closed bottom end. Peripheral hole 303a is formed through second header 303 at a location adjacent and above the closed bottom end. As in the embodiment of FIG. 6, the open ends of tubes 21 are disposed within header pipes 250 and 303 such that refrigerant gas flows through flat tubes 21 from header pipe 250 towards header pipe 303, and condenses in flat tubes 21 such that the condensed liquid refrigerant flows into header pipe 303. Pipe member 310 is disposed within header pipe 303 such that the upper open end of pipe member 310 is hermetically fixed to outlet union joint 240a and is in fluid communication with channel 245, and the lower open end of pipe member 310 is disposed above and adjacent the bottom end of header pipe 303.

Furthermore, cylinder 33 is fixedly disposed between first header pipe 250 and second header pipe 303, at a location below heat exchanging region 203a. One end of cylinder 33 is closed and is securely fixed to first header pipe 250. The opposite end of cylinder 33 is opened and is disposed through hole 303a of second header pipe 303 such that the interior of cylinder 33 is in fluid communication with the interior of second header pipe 303. The opened end of cylinder 33 is fixedly and hermetically connected to second header pipe 303.

In operation, the condensed refrigerant fluid drips downwardly within second header pipe 303, and collects to a minimal level. After this level is reached, the refrigerant fluid flows through the open end of cylinder 33 so as to accumulate therein. As in the embodiments of FIGS. 6-11, the condensed refrigerant liquid accumulated within cylinder 33 and the bottom of second header pipe 303 flows upwardly through pipe member 310 and channel 245 of outlet joint 240a and into further elements of the refrigeration circuit. Therefore, cylinder 33 serves the function of receiver 30 which is eliminated from the circuit. The embodiment of FIGS. 12-14 has the further advantage that the structure of condenser 203 is strengthened due to the provision of cylinder 33 which is fixedly disposed between first and second header pipes 250 and 303.

This invention has been described in detail in connection with the preferred embodiments. These embodiments, however, are merely for example only and the invention is not restricted thereto. It will be understood by those skilled in the art that other variations and modifications can easily be made within the scope of this invention as defined by the appended claims.

I claim:

1. In a condenser for a refrigerant fluid circuit, said condenser comprising a plurality of tubes having opposite first and second open ends, a plurality of fin units disposed between said plurality of tubes, first and second header pipes fixedly disposed at said opposite ends respectively, said open ends of said tubes disposed in fluid communication with the interior of said header pipes, said first header pipe having an inlet means for linking the condenser to an external element of the circuit, said second header pipe having a closed end and an outlet means for linking the condenser to an external element of the circuit, the improvement comprising:

said closed end of said second header pipe disposed at a location below said outlet means, said condenser further comprising a pipe member having opposite open ends and disposed within said second header pipe, one open end of said pipe member disposed near said closed end of said second header pipe, a second open end of said pipe member hermetically linked to said outlet means such that refrigerant fluid flows from said condenser to the external elements of the circuit exclusively through said pipe member; and refrigerant accumulating means for accumulating condensed liquid refrigerant therein, said accumulating means disposed at and closing the closed end of said second header pipe.

2. The condenser recited in claim 1, said tubes being essentially flat.

3. In a condenser for a refrigerant fluid circuit, said condenser comprising a plurality of tubes having opposite first and second open ends, a plurality of fin units disposed between said plurality of tubes, first and second header pipes fixedly disposed at said opposite ends respectively, said open ends of said tubes disposed in fluid communication with the interior of said header pipes, said first header pipe having an inlet means for linking the condenser to an external element of the circuit, said second header pipe having an outlet means for linking the condenser to an external element of the circuit, the improvement comprising:

said second header pipe having first and second open ends, said outlet means having a channel therethrough for hermetically closing said first end of said second header pipe except for said channel, an accumulating means for accumulating refrigerant fluid disposed at and closing said second open end of said second header pipe, and a pipe member having open ends and disposed within said second header pipe, one open end of said pipe member extending beyond said second open end of said second header pipe and terminating within said accumulating means, a second open end of said pipe member hermetically linked to said channel of said outlet means.

4. The condenser recited in claim 3, said first end of said second header pipe disposed at the upper side of said condenser, said second end of said second header pipe disposed at the lower side of said condenser.

5. The condenser recited in claim 4, said accumulating means comprising a tank having an opening, the second open end of said second header pipe opening into said tank.

6. The condenser recited in claim 5, said tank having a rectangular parallelepiped shape.

7. The condenser recited in claim 6, said tank disposed so as to project from the lower surface of the condenser.

8. The condenser recited in claim 3, said accumulating means comprising a tank having an opening, the second open end of said second header pipe opening into said tank.

9. The condenser recited in claim 8, said tank having a rectangular parallelepiped shape.

10. The condenser recited in claim 9, said tank disposed so as to project from the lower surface of the condenser.

11. The condenser recited in claim 3, the overall boundary of said condenser being rectangular, said accumulating means disposed in a corner within said boundary and bordered by said second header pipe and the region defined by said tubes and fin units.

12. The condenser recited in claim 3, said tubes and said fin units comprising a heat exchanging region, said accumulator means projecting outwardly from said heat exchanging region.

13. The condenser recited in claim 3, said second header pipe being shorter than said first header pipe, said plurality of tubes comprising a group of one or more tubes which are shorter than the remaining tubes, said tubes of said group of tubes opening into said accumulating means such that said accumulating means projects into a region within the cross-sectional boundary of said condenser as defined by the length of said first header pipe and the length of said remaining tubes.

14. The condenser recited in claim 13, said accumulating means comprising a tank having an opening, the second open end of said second header pipe opening into said tank.

15. The condenser recited in claim 14, said tank having a rectangular parallelepiped shape.

16. The condenser recited in claim 3, said tubes being essentially flat.

17. In a condenser for a refrigerant fluid circuit, said condenser comprising a plurality of tubes having opposite first and second open ends, a plurality of fin units disposed between said plurality of tubes, first and second header pipes fixedly disposed at said opposite ends respectively, said open ends of said tubes disposed in fluid communication with the interior of said header pipes, said first header pipe having an inlet means for linking the condenser to an external element of the circuit, said second header pipe having a first open end and a closed second end, an outlet means disposed at said first open end of said second header pipe for linking the condenser to an external element of the circuit, the improvement comprising:

said outlet means having a channel therethrough and hermetically sealing said first open end of said second header pipe except for said channel, said second header pipe including a hole formed through a peripheral surface at a location adjacent said closed end, said condenser further comprising a pipe member having opposite open ends disposed within said second header pipe, one open end of said pipe member disposed near said closed second end of said second header pipe, a second open end of said pipe member hermetically linked to said channel of said outlet means, and a refrigerant accumulating means for accumulating condensed liquid refrigerant and disposed at said closed second end of said second header pipe, the interior of said accumulating means linked to the interior of said second header pipe through said hole.

18. The condenser recited in claim 17, said first open end of said second header pipe disposed at the upper side of said condenser, said closed second end of said second header pipe disposed at the lower side of said condenser.

19. The condenser recited in claim 18 said accumulating means comprising a cylindrical tank.

20. The condenser recited in claim 17, said accumulating means comprising a cylindrical tank.

21. The condenser recited in claim 20, said first and second header pipes having portions projecting beyond the lowermost of said plurality of tubes, said cylindrical tank having a closed end and an open end, said cylindrical tank extending between said projecting portions of said first and second header pipes, said open end of said cylindrical tank disposed through said hole of said second header pipe, said closed end of said cylindrical tank fixedly secured to an exterior surface of said first header pipe.

22. In a refrigerant circuit comprising a compressor, a condenser, an expansion element and an evaporator sequentially disposed, the improvement wherein said condenser comprises first and second header pipes and a heat exchanging region, said heat exchanging region further including a plurality of tubes disposed between said first and second header pipes and a plurality of fin units disposed between adjacent tubes, said condenser further comprising an integrally formed receiver disposed adjacent said heat exchanging region and a pipe member disposed in said second header pipe and having a first open end linked to said evaporator and a second open end, said receiver comprising an accumulating tank disposed in fluid communication with said second open end of said pipe member.

23. The circuit recited in claim 22, said tank having a cylindrical shape and disposed adjacent and parallel to said tubes.

24. The circuit recited in claim 22, said tubes being essentially flat.

25. The circuit recited in claim 22 said expansion element comprising an expansion valve disposed between said condenser and said evaporator.

26. A refrigerant circuit comprising a compressor, a condenser, an expansion element and an evaporator sequentially disposed, said condenser comprising a plurality of tubes having opposite first and second open ends, a plurality of fin units disposed between said plurality of tubes, first and second header pipes fixedly disposed at said opposite ends respectively, said open ends of said tubes disposed in fluid communication with the interior of said header pipes, said first header pipe having an inlet means for linking the condenser to an external element of the circuit, said second header pipe having a first end and a second end, an outlet means disposed at said first end of said second header pipe for linking the condenser to said expansion element, said outlet means hermetically sealing said first end of said second header pipe except for a channel therethrough, a receiver closing said second end of said second header pipe, a pipe member having open ends and disposed within said second header pipe, one open end of said pipe member disposed near said second end of said second header pipe, a second open end of said pipe member hermetically linked to said channel of said outlet means, condensed refrigerant fluid flowing to said expansion valve exclusively through said pipe member and said channel of said outlet means.

27. In a condenser for a refrigerant fluid circuit, said condenser comprising at least first and second header pipes and a plurality of tubes in fluid communication with said first and second header pipes, a plurality of fin units disposed between adjacent tubes, and a receiver disposed adjacent and in fluid communication with one of said header pipes, said receiver forming an integral part of said condenser and having a cross-sectional area which is larger than the cross-sectional area of said one of said header pipes, an outlet disposed on said one header pipe at one location, and a hollow pipe member disposed within said one header pipe, a first end of said pipe member in fluid communication with said outlet, a second end of said hollow pipe member in fluid communication with said receiver.

28. A condenser comprising:
first and second header pipes, one said header pipe having an opening;
a plurality of tubes disposed in fluid communication with said first and second header pipes;
a plurality of fin units disposed between adjacent tubes;
a receiver forming an integral part of said condenser and having an open top connected in fluid communication with said one header pipe and having a bottom; and
an outlet pipe having an open inlet end located within said receiver and adjacent said bottom and having an outlet end sealed to and extending from said one header pipe.

29. A refrigerant circuit comprising a compressor, a condenser, an expansion element and an evaporator sequentially disposed, said condenser comprising:
first and second header pipes, one said header pipe having an opening;
a plurality of tubes disposed in fluid communication with said first and second header pipes;
a plurality of fin units disposed between adjacent tubes;
a receiver forming an integral part of said condenser and having an open top connected in fluid communication with said one header pipe and having a bottom; and
an outlet pipe having an open inlet end located within said receiver and adjacent said bottom and having an outlet end sealed to and extending from said one header pipe.

30. A condenser comprising:

first and second header pipes and a heat exchanging region, an outlet disposed on said second header pipe, said heat exchanging region further including a plurality of tubes disposed between said first and second header pipes and a plurality of fin units disposed between adjacent tubes, said condenser further comprising an integrally formed receiver disposed adjacent said heat exchanging region, and a pipe member disposed in said second header pipe and having a first open end linked to said outlet and a second open end, said receiver comprising an accumulating tank disposed in fluid communication with said second open end of said pipe member.

* * * * *